3,493,117
MULTI-MEDIA FILTER UNITS
Derrick Percival Tuffnell, Southampton, and Stanley William Kemp, Totton, England, assignors to General Motors Corporation, Detroit, Mich., a corporation of Delaware
Filed Sept. 20, 1967, Ser. No. 669,065
Claims priority, application Great Britain, Sept. 29, 1966, 43,496/66
Int. Cl. B01d 27/06, 25/02
U.S. Cl. 210—266                                 10 Claims

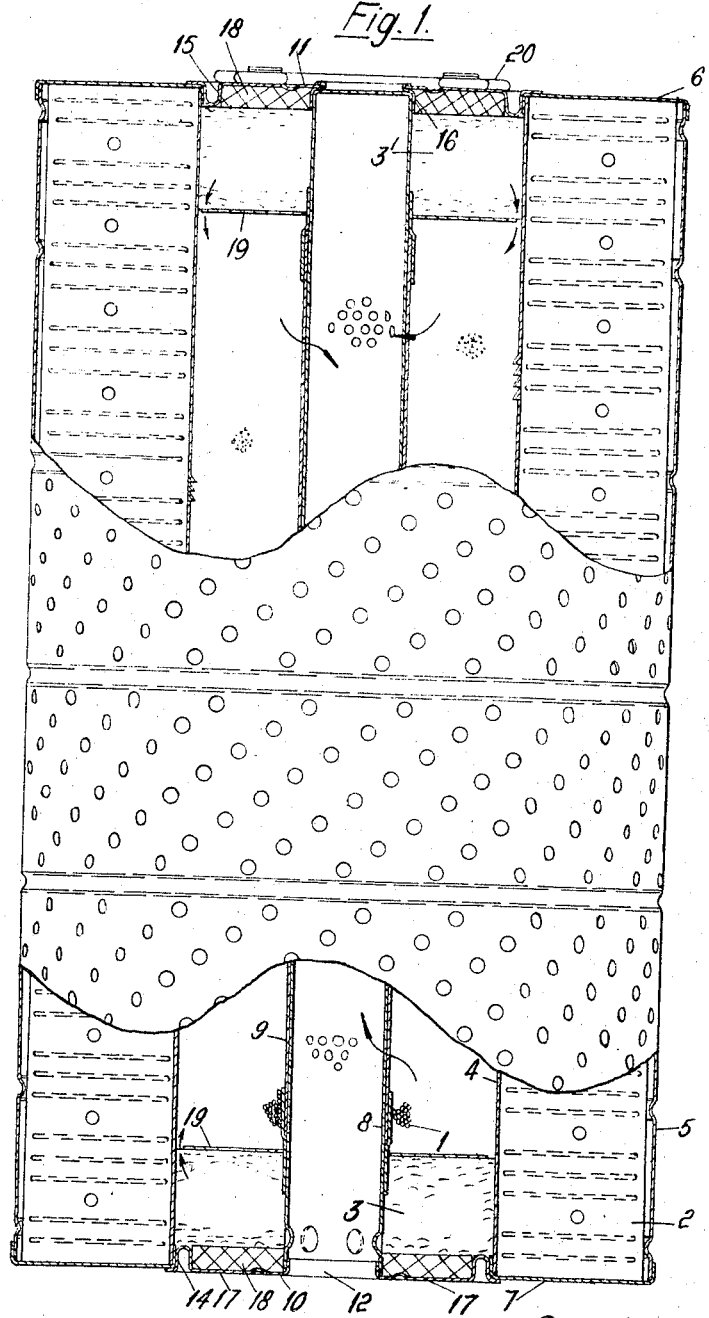

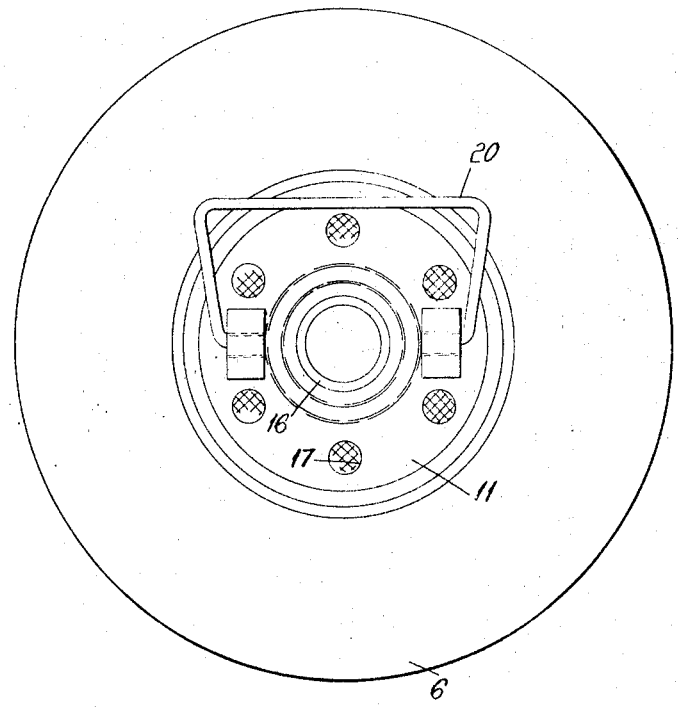

ABSTRACT OF THE DISCLOSURE

In order to improve the life of a dry cleaner filter element, having an outer paper element and an inner element consisting of carbon granules the end cap overlying the carbon granules is perforated and a layer of felt or like material is placed on top of the carbon granules, so as to provide a flow of liquid through the felt and then the carbon granules in addition to the flow which goes through the paper and then through the carbon.

STATE OF THE PRIOR ART

Great Britain 573,195 Oatway shows a filter comprising concentric rings 8 of perforate material located between end plates 9, 10 with intervening layers of resilient material.

This invention relates to multi-media filter units and in particular to multi-media filter units intended for use in filtering the liquids used in dry-cleaning processes.

In a multi-media filter unit according to the invention an annular chamber for a filter element made of a first filter medium lies between a perforate centre tube and an outer annular element made of a second filter medium, and an annular element made of a third filter medium is arranged at one end of said unit to permit liquid to flow in series through the third and first media and, in parallel therewith, in series through the second and first medium to said centre tube.

The scope of the invention is defined by the appended claims; and the invention and the method by which it is to be performed are hereinafter particularly described with reference to the accompanying drawings, in which:

FIGURE 1 is a vertical section through a filter unit according to the invention; and FIGURE 2 is a plan of the unit shown in FIGURE 1.

The multi-media filter unit shown in the drawing includes a first annular filter element 1 of one filter medium, a second annular filter element 2 of another filter medium, and two other annular filter elements 3, 3' of a third filter medium.

The annular element 2 is the outer element of the assembly and is made of pleated sheet filter material such as synthetic resin-impregnated filter paper and is interposed between an inner perforate metal sleeve 4 and an outer metal perforate sleeve 5 to which imperforate annular metal end plates 6, 7 are respectively secured at the upper and lower ends of the element 2.

The filter element 1 comprises a mass of granular activated carbon which is retained in an annular chamber between the inner sleeve 4 and a perforate centre tube 8, the latter constituting the outlet for filtered liquid from the filter unit. Materials such as manganese silicate or calcium silicate, which are used to control the level of fatty acid in the liquid used in dry cleaning processes may be included with the carbon 1, such materials preferably being in granular rather than powder form. The centre tube 8 is preferably surrounded by a fabric sleeve 9 in order to prevent the granules of carbon 1 or other material passing through the openings in the centre tube 8.

The filter elements 3, 3' are each formed as an annular pad of felt, cotton waste or like fibrous material which operates to give depth filtration rather than surface filtration, the two pads respectively fitting over opposite ends of the centre tube 8 and between the centre tube 8 and the inner metal sleeve 4, the pads each pressing against one end of the annular mass of carbon granules of the filter element 1.

The pads 3, 3' are respectively retained in position by means of perforate annular end plates or caps 10, 11 the inner periphery of the end cap 10 having an annular flange 12 which is press-fitted within the lower end of the centre tube 8, the outer periphery of the end cap being formed with a flanged annular bead 14 which is press-fitted within the end of the perforate sleeve 4.

The other end cap 11 has at its outer periphery an annular flanged bead portion 15 similar to the portion 14 on the end cap 10 and is similarly press-fitted into the upper end of the perforate sleeve 4. At its inner periphery the end cap 11 fits over a short retainer sleeve 16 which is secured to the upper end of the centre tube 8, the upper end of the sleeve 16 being crimped over the inner edge of the end cap 11 to secure the end cap 11 to the centre tube 8. The end caps 10 and 11 are each formed with a plurality of inlet openings 17 therein; and a layer of wire mesh 18 is preferably interposed between each of the end caps 10, 11 and the underlying felt pads 3, 3' respectively in order to ensure that liquid which enters through the openings 17 can pass freely to the whole of the end surface of the pads 3, 3'. Alternatively, the end caps 10, 11 may be formed with ridges or like formations to ensure free passage of the liqud to the underlying filter material.

Annular impermeable discs 19 which fit closely over the centre tube 8 but are slightly smaller in diameter than the sleeve 4 are preferably interposed between the ends of the mass of carbon granules 1 and the adjacent annular felt pads 3, 3' in order to ensure that liquid which passes through the felt pads also passes through the whole radial thickness of the carbon granules 1 and does not pass directly from the felt into the centre tube 8. The portions of the centre tube 8 adjacent the inner periphery of the felt pads 3, 3' are also made impermeable for the same purpose, and the perforations in the centre tube preferably terminate short of the portion of the centre tube adjacent the felt elements 3, 3' as shown.

The end cap 11 has a carrier handle 20 pivotally secured thereon.

In use, for example for filtering the liquid which is employed in a clothes dry-cleaning system, the unit is arranged so that the dry-cleaning liquid is delivered to the exterior of the filter unit, the ends of the centre tube 8 of the unit being arranged in the liquid circulation path of the system so that filtered dry-cleaning liquid is returned for further use.

The liquid can pass radially through the outer annular element 2 of pleated filter paper and then through the mass of activated carbon granules 1 before passing into the centre tube 8: at the same time liquid can also pass through the perforate end plates 10, 11 through the felt or like material 3, 3', and then through the carbon granules 1 and into the perforate centre tube 8.

Thus, during initial use of the filter unit there will be a series flow of liquid through the filter paper 2 and the carbon 1 and, in parallel therewith, a flow of liquid in series through the felt 3, 3' and the carbon 1. The paper 2 initially offers less resistance to liquid flow, owing to its large area, than that offered by the felt 3, 3', so that, during an initial period of operation there will be a greater proportion of the total flow of liquid passing into the centre tube 8 by way of the paper filter element 2 than by way of the felt filter elements 3, 3'. During further use, as the paper 2 gradually becomes clogged with filtered-out particles, a greater proportion of the liquid passes through the felt filter elements 3, 3'.

The provision of the felt elements which facilitate this liquid flow in parallel with but by-passing the paper element 2 retards the rate of increase of flow-restriction which would normally occur if a paper element only were used. The reduced pressure drop across the paper 2 results in increased efficiency of retention of dirt particles and compensates for the relative inefficiency of the felt elements 3, 3'. The combination of the two elements therefore provides an increased overall life of the filter unit without loss in cumulative filtering efficiency.

The overall life of the filter unit dscribed is greater than that of a similar unit in which the third filter medium is not present.

We claim:

1. A multi-media filter unit adapted to receive a flow of dry-cleaning liquid comprising a perforate centre tube and an outer annular element surrounding said centre tube and spaced therefrom to form an annular chamber having an annular filter element made of a first filter medium between said perforate centre tube and said outer annular element, said outer annular element made of a second filter medium adapted to receive a first portion of said liquid, an annular element made of a third filter medium arranged at at least one end of said unit and having one annular side thereof adjacent one annular end surface of said first filter medium and coextensive therewith, fluid impermeable means fitting closely adjacent said centre tube but having a dimension slightly less in dimetrical direction than that of the outer annular element and being interposed between said one annular end surface of the first filter medium and said one annular side of the third filter medium, the portion of said centre tube adjacent the inner periphery of said third filter medium being made impermeable, and a perforate end plate adjacent the other annular side of said third filter medium and spaced therefrom in a manner to ensure that a second portion of said liquid which enters the perforations of said end plate can flow freely to substantially the whole of said other annular side of said third filter medium while said first portion of said liquid is flowing through said second filter medium to said first fllter medium, thereby to permit said second portion of said liquid to flow in series through said third and first filter media to said centre tube while said first porton of said liquid flows in series through said second and first filter media to said centre tube.

2. A filter unit according to claim 1, in which the filter medium in said annular chamber is granular activated carbon.

3. A filter unit according to claim 2, in which the outer annular element is made of pleated sheet filter material interposed between an inner and an outer perforate metal sleeve to which imperforate annular metal end plates are secured to form a housing for the outer annular element.

4. A filter unit according to claim 3, including with said carbon a material which, in the use of the filter unit to filter the liquid used in dry-cleaning processes, acts to control the level of fatty acids in the liquid.

5. A filter unit according to claim 3, in which said centre tube is surrounded by a sleeve of a fabric which will prevent the granules of carbon passing therethrough into said centre tube.

6. A filter unit according to claim 3, in which said third filter medium is a mass of fibrous material which operates to give depth filtration.

7. A filter unit according to claim 6, in which said fibrous material is in the form of an annular pad which fits over said centre tube and between the centre tube and the inner periphery of the outer annular element, the pad pressing against one end of the filter medium in said annular chamber.

8. A filter unit according to claim 7, in which said annular element of the third filter medium is retained in position by means of said perforate end plate which is press-fitted within an opening in one of said imperforate annular metal end plates at one end of the filter unit.

9. A filter unit according to claim 7, in which said fluid impermeable means is an annular impermeable disc fitting closely over said centre tube but being slightly less in diameter than that of the inner sleeve housing the outer annular element and being interposed between said one annular end surface of the carbon and said one annular side of the annular pad of fibrous material.

10. A multi-media filter unit adapted to receive a flow of dry-cleaning liquid comprising a perforate centre tube and an outer annular element surrounding said centre tube and spaced therefrom to form an annular chamber having an annular filter element made of a first filter medium between said perforate centre tube and said outer annular element, said outer annular element made of a second filter medium adapted to receive a first portion of said liquid, and an annular pad made of a third filter medium arranged at each end of said unit and each pad having one annular side thereof adjacent respectively one annular end surface of said first filter medium and coextensive therewith, and annular impermeable disc at each end of said unit between each annular pad and the respective end surface of said first filter medium, each disc fitting closely over said centre tube but being slightly less in diameter than the adjacent annular pad to form a flow passage between said disc and said outer annular element, and a perforate end plate arranged at each end of said unit adjacent the other annular side respectively of each pad and spaced therefrom by a layer of wire mesh in a manner to ensure that a second portion of said liquid which enters the perforations of each of said end plates can flow freely to substantially the whole of said other annular side of each pad while said first portion of said liquid is flowing through said second filter medium to said first filter medium, thereby to permit said second portion of said liquid to flow in series through said pads respectively, said flow passage formed by said disc and said first filter medium to said centre tube while said first portion of said liquid flows in series through said second and first filter medium to said centre tube.

References Cited

UNITED STATES PATENTS

| | | | |
|---|---|---|---|
| 3,021,955 | 2/1962 | Joyce | 210—315 X |
| 3,189,179 | 6/1965 | McMichael | 210—315 X |
| 3,201,346 | 8/1965 | Benedict | 210—282 X |
| 3,348,693 | 10/1967 | Cornell | 210—315 X |

SAMIH N. ZAHARNA, Primary Examiner

U.S. Cl. X.R.

210—282, 457